C. LEA.
VARIABLE SPEED TRANSMISSION MECHANISM.
APPLICATION FILED APR. 22, 1912.
1,090,401.
Patented Mar. 17, 1914.
4 SHEETS—SHEET 1.
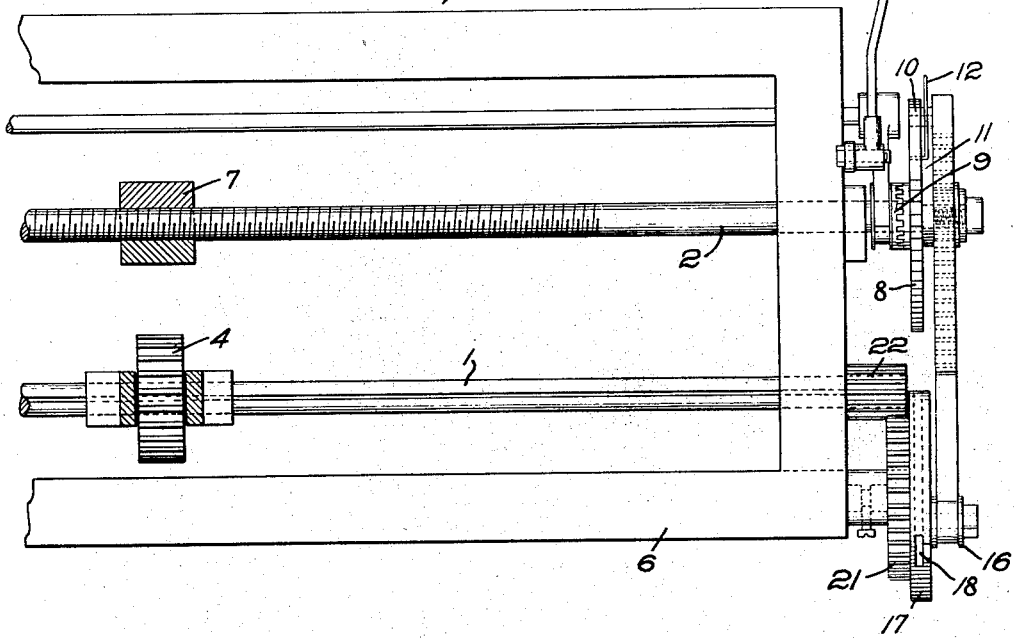
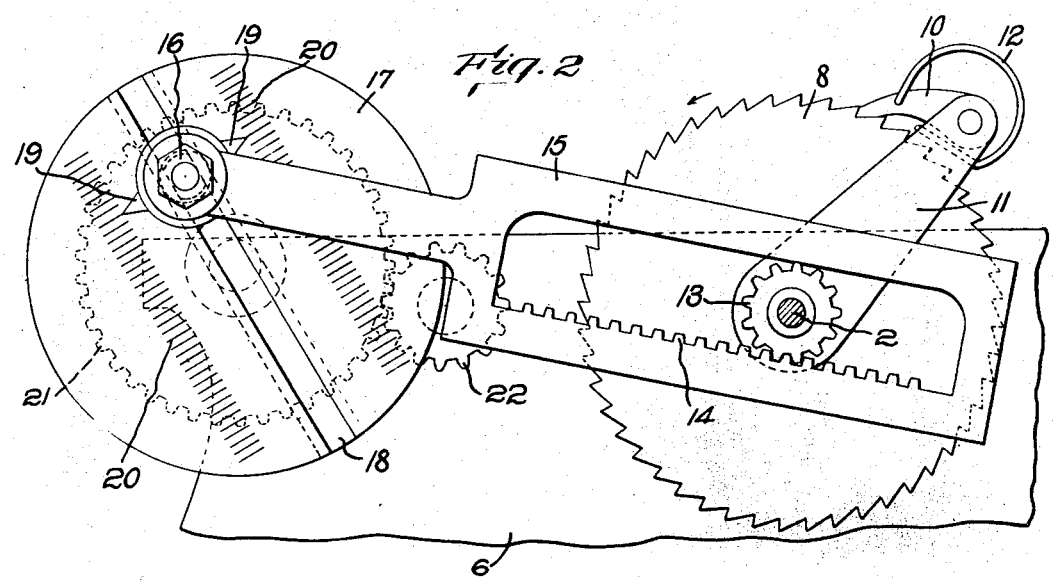
Witnesses:
Horace A. Grossman
Carl L. Choate
Inventor
Charles Lea.
by Emery Booth Janney Varney
Attys.

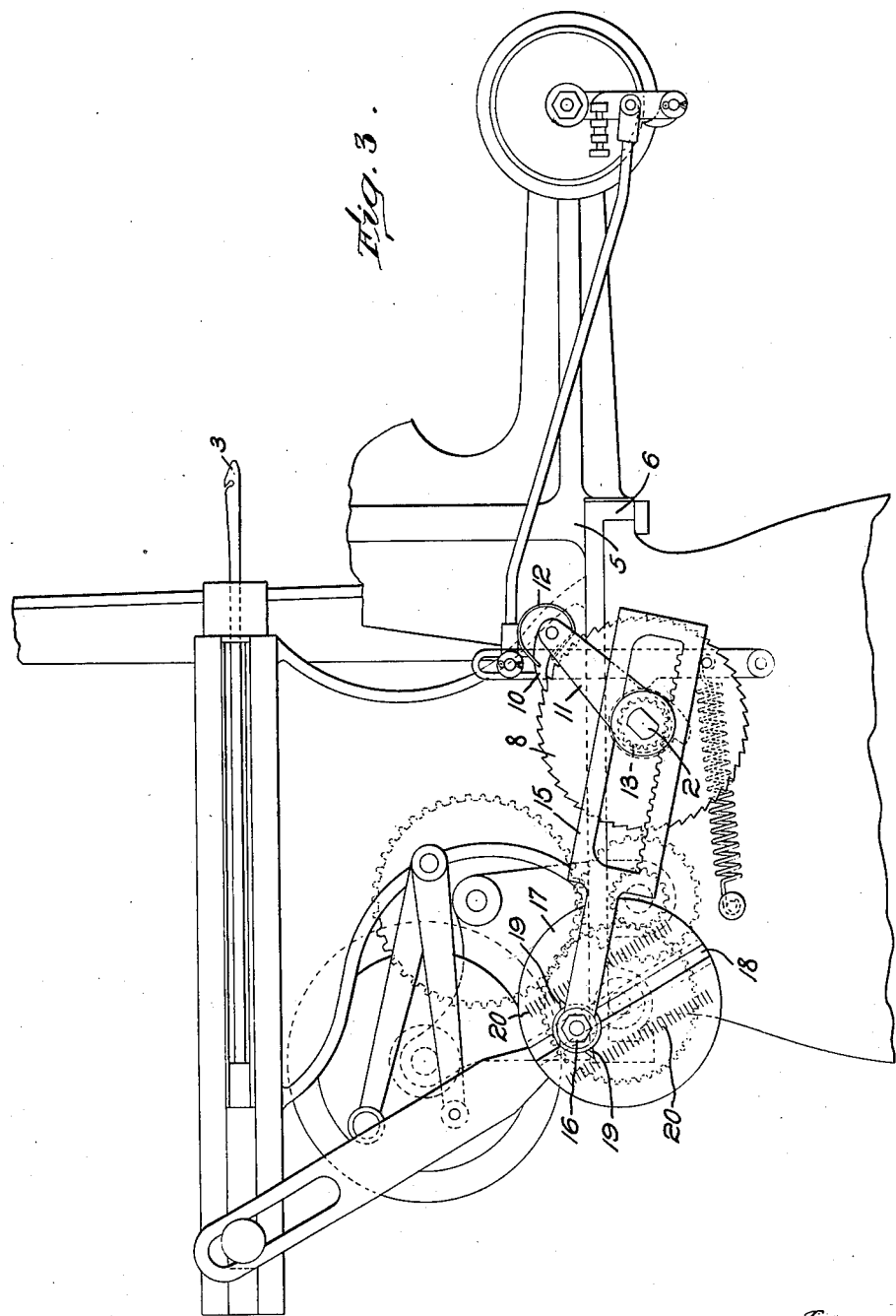

C. LEA.
VARIABLE SPEED TRANSMISSION MECHANISM.
APPLICATION FILED APR. 22, 1912.
1,090,401.
Patented Mar. 17, 1914.
4 SHEETS—SHEET 3.
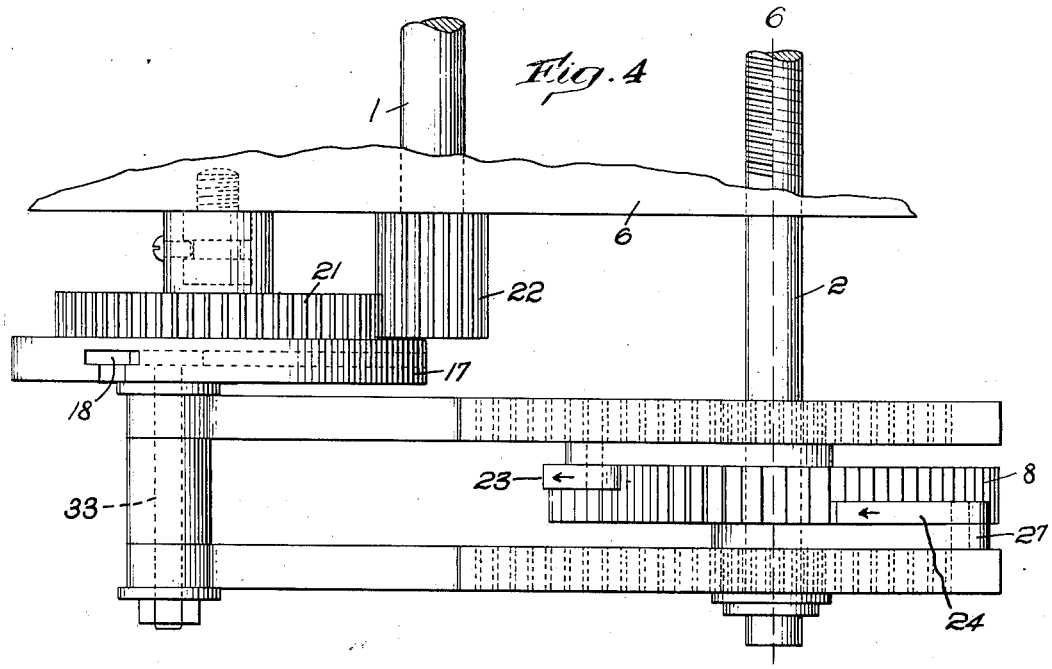
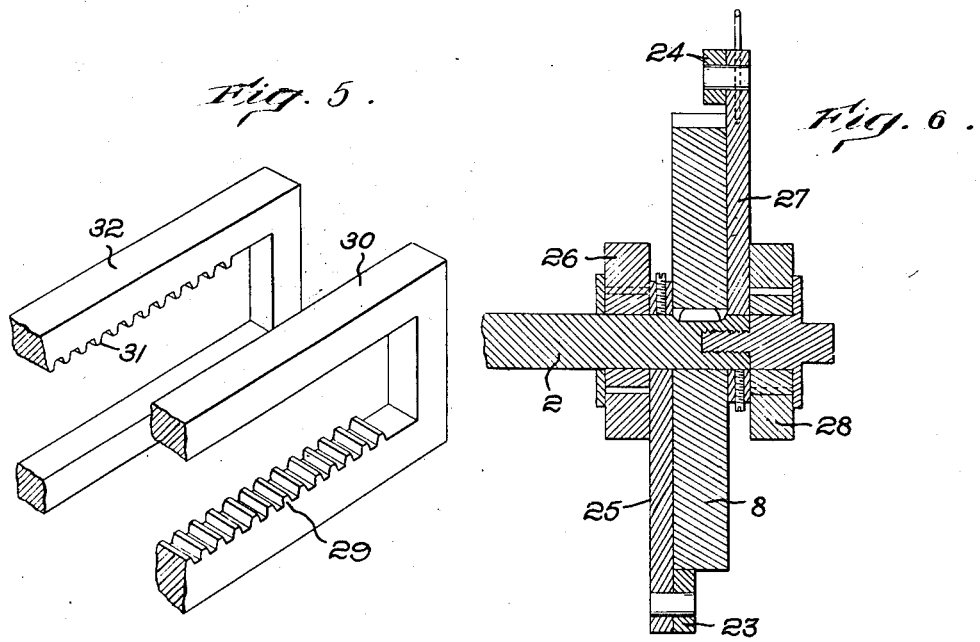
Witnesses:
Horace A. Crossman
Carl L. Choate
Inventor
Charles Lea C. LEA.
VARIABLE SPEED TRANSMISSION MECHANISM.
APPLICATION FILED APR. 22, 1912.
1,090,401.
Patented Mar. 17, 1914.
4 SHEETS—SHEET 4.
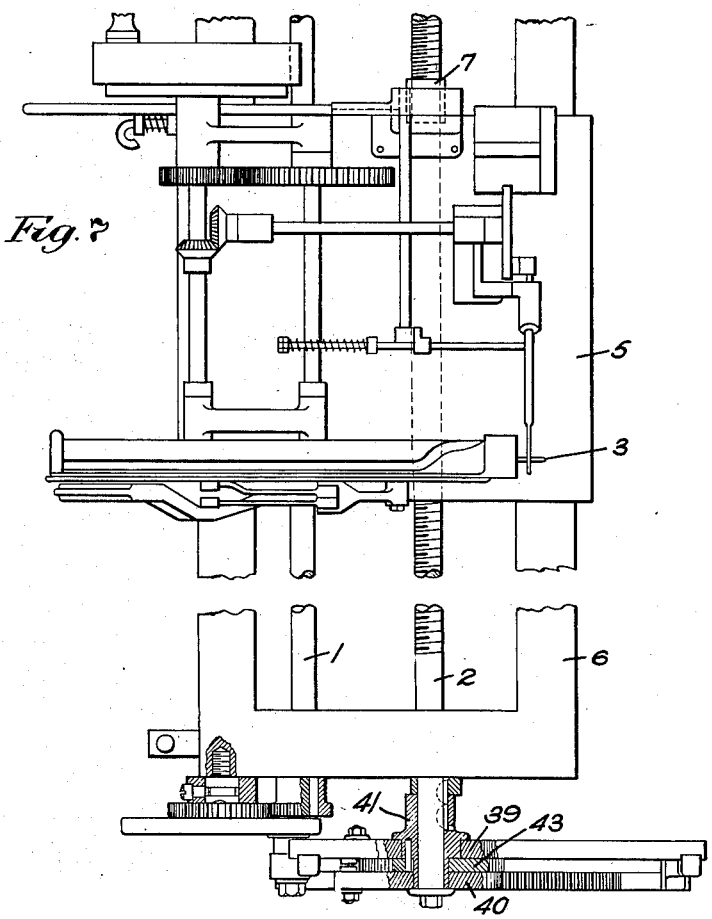
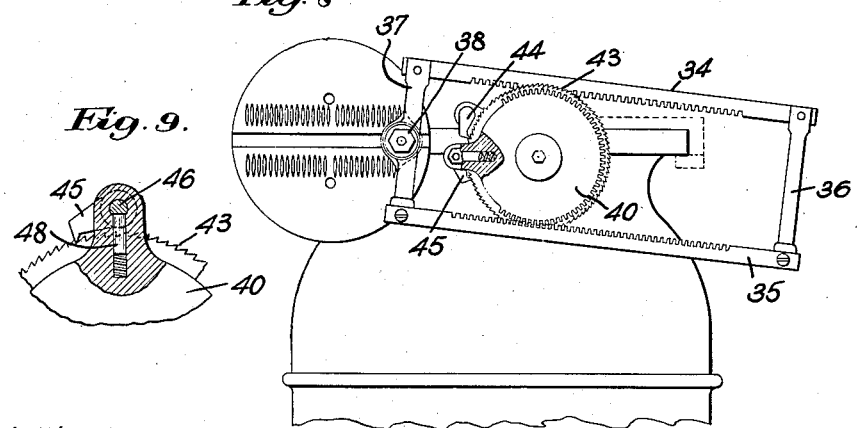
Witnesses:
Horace A. Crosman
Carl L. Choate
Inventor:
Charles Lea.
by Emery Booth Janney Varney
Attys.

UNITED STATES PATENT OFFICE.

CHARLES LEA, OF BOSTON, MASSACHUSETTS, ASSIGNOR TO AMERICAN WARP DRAWING MACHINE COMPANY, A CORPORATION OF MAINE.

VARIABLE-SPEED-TRANSMISSION MECHANISM.

1,090,401. Specification of Letters Patent. Patented Mar. 17, 1914.

Application filed April 22, 1912. Serial No. 692,469.

*To all whom it may concern:*

Be it known that I, CHARLES LEA, a citizen of the United States, and a resident of Boston, county of Suffolk, State of Massachusetts, (whose post-office address is corner of Freeport and Beach streets, Dorchester, Massachusetts,) have invented an Improvement in Variable-Speed-Transmission Mechanism, of which the following description, in connection with the accompanying drawings, is a specification, like characters on the drawings representing like parts.

This invention relates to variable speed transmission mechanisms, the object of the invention being to provide simple but effective means for positively transmitting power from a driving member to a driven member at different speed ratios, adjustable within wide limits of finely graduated steps.

The invention will be best understood by reference to the following description when taken in connection with the accompanying illustration of one specific embodiment thereof, while its scope will be more particularly pointed out in the appended claims.

In the drawings: Figure 1 is a plan view showing one form of the invention applied to the transmission of power from one shaft to a second parallel shaft. Fig. 2 is a side elevation on an enlarged scale showing the principal parts of the power transmitting mechanism of Fig. 1; Fig. 3 is a side elevation of the variable speed transmitting device applied to a warp drawing-in machine; Fig. 4 is a plan view showing a modified form of double-acting transmission mechanism; Fig. 5 is a detail thereof; Fig. 6 is a section on the line 6—6 in Fig. 4; Fig. 7 is a plan view showing a slightly modified form of double-acting speed transmitting device applied to a warp drawing machine; Fig. 8 is a side elevation of the transmitting mechanism shown in Fig. 7; and Fig. 9 is a detail in sectional elevation taken through one of the pawl supports.

Referring to the drawings and first to the illustrative embodiment of the invention which is shown in Figs. 1 and 2, I have there shown for purposes of illustration a driving shaft 1 from which it is required to transmit power at variable speeds to a parallel driving shaft 2. The specific application by which I have illustrated my invention herein disclosed is its application to a warp drawing-in machine of the type shown in Patents Nos. 871,680 and 980,086, additional parts of which are illustrated in Figs. 3 and 7. The shaft 1 (see Figs. 3 and 7) constitutes the main driving shaft of the machine and serves to reciprocate the drawing-in needle 3 through the sliding gear 4 (see Fig. 1) splined on the shaft 1, the needle being mounted upon the traversing carriage 5 adapted to slide along the machine frame 6. The driven shaft 2 constitutes a lead screw engaging the nut 7 attached to the carriage 5 and therefore serves to traverse the carriage. In practice it is required to vary the rate of the rectilinear traverse of the needle carriage 5 in relation to the number of needle picks per minute and therefore in relation to the speed of the main driving shaft 1 in order to adapt the machine to warps containing a different number of threads per inch. For this purpose a positive speed change device is required, occupying but a small space and readily, but accurately adjustable to secure the necessary variation in the traverse of the carriage.

It will be understood that while the hereinafter described form of speed transmission device is particularly adapted to meet the requirements for use in connection with a warp drawing-in machine, its application thereto is merely illustrative and the invention in no way limited to that or any other particular use.

In the form of the invention shown in Fig. 1, the lead screw shaft 2 is turned step by step by means of a ratchet wheel 8, the latter connected to the end of the shaft 2 outside of the frame 6 of the machine, an intervening clutch member 9 being provided, which, however, forms no essential part of the present invention. To engage the ratchet teeth, there is provided a pawl 10 pivoted upon the end of the swinging arm 11 and maintained in engagement with the ratchet teeth by the spring 12. The arm 11 is carried by a sleeve journaled upon the shaft 2 so as to be capable of oscillating about the same, the said sleeve also carrying the small spur gear 13, the teeth of which mesh with the teeth of a rack 14, which latter is carried by the reciprocatory arm 15. The opposite end of the arm is swiveled upon a stud 16 adjustably clamped to the face of the crank disk 17 so that by varying the eccentricity of the stud on the face of the disk the throw of the rack carrying member can be varied.

Any suitable means for adjusting the connecting arm may be employed, but as herein shown, the crank disk is provided with a T-slot 18 extending diametrically across the disk and adapted to receive the head of the stud 16 so that the latter may be clamped to the disk at any point along the slot. Preferably, the stud is provided with an index finger 19 on one or both sides of the slit, which index finger is adapted to register with graduations 20. These may be marked according to any arbitrary scale either in terms denoting the number of needle picks per inch secured, or in any other terms desired. As the driving shaft 1 is turned at constant speed, the rack member is reciprocated, the teeth of the rack being held in engagement with the pinion by the upper member of the connecting arm which slides along the top of the pinion teeth. With each complete reciprocation of the rack, the pawl arm executes one complete oscillation, the extent of the oscillation and the number of teeth passed over, and consequently the angle to which the lead screw is turned, depending upon the distance the stud 16 is from the center of the crank 17. By setting the stud near the outer end of the T-slot 18 the throw of the rack may be made great enough to oscillate the pawl arm through substantially 360° and turn the lead screw through a complete revolution for each revolution of the crank disk 17. On the other hand, the stud may be adjustably set in different positions toward the center of the disk to cut down the throw of the pawl arm and thereby reduce the rectilinear advance of the needle carriage by small gradations, the fineness of which depends merely upon the number and size of the teeth upon the ratchet 8.

The crank disk 17 may be driven from the main driving shaft 1 by any suitable means, herein at reduced speed by means of the gear 21 attached to the crank disk and meshing with the pinion 22 on the drive shaft 1.

In the described form of transmitting device the movement of the driven member is intermittent, there being between each period of movement an equal period of dwell while the pawl is being moved back over the ratchet teeth. In Figs. 4 to 6, inclusive, there is illustrated a form of variable speed transmitting device similar in principle to that described, but wherein the driven member is moved both during the forward and backward movement of the connecting arm, the result being that the lead screw is given successive movements interrupted by an instant only of dwell occurring at the time the connecting member reverses its movement.

Referring to the form shown in Figs. 4 to 6, inclusive, the construction of the crank disk and its driving mechanism is similar to that shown in Figs. 1 and 2. The driven shaft 2 also has a similar ratchet 8 but the teeth thereof are engaged by a pair of pawls 23 and 24, one working on one side of the ratchet and the other on the opposite side. The pawl 23 is pivoted on the arm 25 secured to the pinion 26 on one side of the ratchet, while the pawl 24 is pivoted on the arm 27 secured to the pinion 28 on the other side of the ratchet. The pinion 28 meshes with the teeth 29 of the connecting member 30, the construction of the latter and its operation being similar to that of the connecting member 15 in the first form described. The pinion 26 meshes with the teeth 31 on a second connecting member 32, the construction whereof is similar to that of the member 30 excepting that the teeth 31 mesh with the pinion 26 at a point diametrically opposite the point of engagement of the pinion 28 and the rack 29. The opposite ends of the two connecting members are journaled upon a common crank pin 33, which latter may be adjustable in the T-slot on the face of the crank disk so that the two connecting members are reciprocated in unison. The result is that while one pawl arm is being moved to turn the ratchet, the remaining pawl arm is being moved in a reverse direction with its pawl slipping freely over the teeth. The moment the connecting member reverses its movement the pawl on the remaining arm grips the teeth of the ratchet and effects a continuation of the rotary movement thereof in the same direction, while the first pawl arm reverses and slips back to get a fresh grip upon the teeth of the larger wheel. The turning of the driven member therefore is effected alternately by the two pawls and their connecting members, the movement-producing engagement of one being immediately established by the other on reversal of the connecting arms. The ratchet 8 in this modification is made sufficiently wide so that the pawls can pass each other without interference, which would be necessitated when the strokes of the pawl arms is lengthened beyond 180°.

In Figs. 7 to 9, inclusive, I have shown a variable speed transmission device similar in form to that last described, but of slightly different construction. In this form upper and lower racks 34 and 35, respectively, are employed, but the same are united by end pieces 36 and 37 to form a single integral connecting member pivoted upon the crank pin 38. The upper rack member is staggered with relation to the lower rack member so that each member meshes with its respective gear 39 and 40, the latter being mounted for free movement about the sleeve 41 keyed to the shaft 2. Between the gears and fixedly secured to the sleeve is the ratchet 43, the teeth of which are engaged by pawls 44 and 45, respectively, carried by gear members 39 and 40. Each pawl (Fig. 9) is journaled upon a rock shaft 46 in a lug 47 projecting from the periphery of the gear, the shaft 46 having a flattened side engaged by the spring-pressed pin 48 by which it is held into engagement with the ratchet teeth under a yielding pressure.

The described form of variable speed transmitting device occupies but a very small space at the end of the machine frame and is effective for obtaining a positive drive from the main drive shaft 1 to the parallel lead screw 2, whereby the rectilinear travel of the carriage 5 may be adjusted to any required rate of progression. When applied to a warp drawing-in machine the travel of the carriage may be set by means of the indicator and scale to provide for any desired number of picks per inch of carriage travel.

While I have herein shown and described for purposes of illustration one specific form of the invention, it is to be understood that the same is not limited to details of construction or relative form or arrangement of parts or to the application herein made of the same, but that extensive deviations may be made therefrom without departing from the spirit thereof.

Claims—

1. In a variable speed transmission device, the combination with a driving member of a driven member, a ratchet connected to the driven member, a pawl and pawl carrying arm, the latter mounted to turn about the axis of the ratchet and impart to the latter a positive step by step feeding movement, a pinion connected to turn the pawl-carrying arm, a rack meshing with the pinion, and an adjustable eccentric connection between the rack and the driving member thereby fixedly to adjust the stroke of the pawl by finely graduated steps.

2. In a variable speed transmission device, the combination with a driving member, a crank disk, a driven member having connected thereto a ratchet wheel, a pawl and pawl-carrying arm, said pawl adapted to impart to the ratchet a positive step by step feeding movement, a pinion connected to turn the pawl-carrying arm, a rack engaging the pinion, and means for adjustably connecting the rack at different radial distances from the center of the crank disk thereby adjustably to fix the throw of the pawl.

3. A variable speed transmission mechanism having a driving member and a driven member, a ratchet and pawl, a ratchet and pawl driving connection for the driving member including two reciprocatory driving gears, a rack connected to the driving member for reciprocating one of said gears, a rack member also connected to said driving member for simultaneously but reversely reciprocating said second gear, a crank disk driven by said driving member, and an adjustable connection between the driving member and the driven member whereby the latter may be connected to the crank disk at different radial distances from the center of the latter.

4. In a variable speed transmission mechanism, the combination with a rotary driving member, a pair of rack members eccentrically connected to the driving member, a driven member, a ratchet connected to said driven member, a pair of pawls and pawl arms disposed in operative relation on opposite sides of said ratchet, a gear connected to each arm meshing each with one of the racks but in reverse relation, and means for adjusting the eccentricity of the rack members relative to the driving member whereby the pawl-actuated movement of the ratchet may be adjusted by finely graduated steps.

In testimony whereof I have signed my name to this specification, in the presence of two subscribing witnesses.

CHARLES LEA.

Witnesses:
E. EDNA SPEY,
THOMAS B. BOOTH.